United States Patent [19]
Capek

[11] Patent Number: 6,112,192
[45] Date of Patent: Aug. 29, 2000

[54] METHOD FOR PROVIDING INDIVIDUALLY CUSTOMIZED CONTENT IN A NETWORK

[75] Inventor: Peter George Capek, Ossining, N.Y.

[73] Assignee: International Business Machines Corp., Armonk, N.Y.

[21] Appl. No.: 08/854,227

[22] Filed: May 9, 1997

[51] Int. Cl.$^7$ ............................. G06F 13/38; G06F 12/14
[52] U.S. Cl. ................................ 705/59; 705/51; 705/14; 705/27; 707/500; 707/530; 707/540; 709/200; 709/206
[58] Field of Search .................................. 705/1, 14, 27, 705/59, 51; 395/700, 200; 348/10; 707/104, 540, 911, 513, 505, 500, 530; 709/200, 206

[56] References Cited

U.S. PATENT DOCUMENTS

| | | | |
|---|---|---|---|
| 5,138,712 | 8/1992 | Corbin | 395/700 |
| 5,155,591 | 10/1992 | Wachob | 358/455 |
| 5,428,778 | 6/1995 | Brookes | 395/364 |
| 5,446,919 | 8/1995 | Wilkins | 455/348 |
| 5,459,306 | 10/1995 | Stein et al. | 235/235 |
| 5,515,098 | 5/1996 | Carles | 348/455 |
| 5,553,143 | 9/1996 | Ross et al. | 705/59 |
| 5,835,726 | 11/1998 | Shwed et al. | 395/200 |
| 5,886,732 | 3/1999 | Humpelman | 348/10 |
| 5,887,133 | 3/1999 | Brown et al. | 709/200 |
| 5,978,579 | 11/1999 | Buxton et al. | 707/530 |
| 5,983,351 | 11/1999 | Giogau | 713/201 |
| 6,026,369 | 2/2000 | Capek | 705/14 |
| 6,038,597 | 3/2000 | Van Wyngarden | 705/27 |

FOREIGN PATENT DOCUMENTS

| | | |
|---|---|---|
| 679980 A1 | 11/1995 | European Pat. Off. . |
| 681233 A1 | 11/1995 | European Pat. Off. . |

OTHER PUBLICATIONS

Export Control News, v4, n9, pN/A, "Deciphering Encryption Controls", Sep. 21, 1990.

IBM Corporation, "Identifying and Tracking Copyright Source: An Automated Process for Handling Copyrighted Information", 1994.

Eric Hall, Network Computing, "Adding Interactive Services to Your Web Server", Jan. 16, 1996.

Chikaraishi et al, Proceedings of the International Conference on Software Maintenance, "An Independent Software-Modification Method", Jan. 1, 1995.

Martin Heller, Windows Magazine Issue: 708 p.: 309, "Prevent Pirages From Copping Controls—Protect Active X controls from Web pirates without inconveniencing legitimate users", Jul. 8, 1996.

Kohda et al., Ubiquitous advertising on the WWW: merging advertisement on the browser, IN Comput. Netw. ISDN Syst. (Netherlands) fifth International World Wide Web Conference, Paris, France, Jun. 5, 1996.

*Primary Examiner*—James P. Trammell
*Assistant Examiner*—Nga B. Nguyen
*Attorney, Agent, or Firm*—Douglas W. Cameron; Anne V. Dougherty

[57] ABSTRACT

A method of customizing and modifying program material to tailor it to a receiving end user or client. When program material is to be generated for future customization or modification, an encrypted license tag is associated with the program material. When examining putatively modifiable program material for possible modification, a license tag is decrypted. If clear text results then the putatively modifiable program material is established to be modifiable or customizable. Then the program material is modified or customized to suit the profile of a client or end user who is to receive this customized program material. With the encrypted license tag, the owner of the program material can control the modifications made to his or her program material.

20 Claims, 6 Drawing Sheets

| Advertiser |
|---|
| PUCCI-MINULLI AUTOMOBILE Co. |

| Start Date | End Date |
|---|---|
| 12/1/1996 | 2/1/1997 |

| Total Number of Insertions Desired |
|---|
| 10000 |

| Geographic Placement |
|---|
| NY , NJ , CT |

| Demographic Target |
|---|
| ESTIMATED INCOME > $50000 |

| Interest Target |
|---|
| SPORTS CARS , CAR RACING |

| Web Use History Target |
|---|
| LESS THAN 10 HOURS PER MONTH |

| Presentation Time Target |
|---|
| 6PM TO 11PM LOCAL TIME |

| Click-Through URL |
|---|
| http://www.pucci.com/group-a.html |

| Image URL |
|---|
| http://www.pucci.com/group-a.gif |

FIG.5

| | REPRESENTATION OF LICENSE TAG | SIZE OF SLOT | TYPE OF DATA STREAM | APPROPRIATE TYPE OF INSERTION |
|---|---|---|---|---|
| WORLD - WIDE WEB | HTML COMMENT OR META TAG | AREA ON DISPLAYED WEB PAGE | HTML, XML | BANNER IMAGE, AUDIO, VIDEO IN WINDOW AS BAMBA, QUICK TIME OR SIMILAR |
| DIGITAL TELEVISION | PRIVATE STREAM OR USER DATA | DURATION OF TIME SLOT | MPEG DATA STREAM | VIDEO AS MPEG |
| ANALOG TELEVISION | BITS IN VERTICAL BLANKING INTERVAL | DURATION OF TIME SLOT | NTSC | NTSC (VIDEO AND AUDIO) |
| INTERNET RADIO/AUDIO | PARALLEL DATA STREAM OR SPARE BITS IN ... | DURATION OF TIME SLOT | REALAUDIO OR OTHER DIGITIZED AUDIO | AUDIO AS DIGITIZED STREAM |

FIG. 6

METHOD FOR PROVIDING INDIVIDUALLY CUSTOMIZED CONTENT IN A NETWORK

DESCRIPTION

1. Technical Field

This invention relates to a method of authorizing and performing customization of data sent over a communications network to a plurality of clients or end users.

2. Description of the Prior Art

There is a great demand for networks on which data in one or more standard forms is transmitted from a relatively large number of sources or servers to an even larger number of clients or customers. Examples include both the World Wide Web and cable TV systems. In today's television systems, programs are transmitted (broadcast) while in the World Wide Web, program material in the form of Web pages is delivered "on demand" from one of many servers to a requesting client. In the future, digital television systems may also operate "on demand." We are concerned here with all of these kinds of systems.

There have been previous attempts to personalize information broadcast over a network. Most such efforts have been in the context of analog television, where they were aimed at insertion of local advertising, either at a local station of a national television network or at the "head end" of a cable system. These approaches have limited flexibility (See U.S. Pat. No. 5,515,098 to Carles.) due both to the broadcast nature of cable TV, and to the limited information available about the customer in these environments.

More recent efforts at customization or personalization on the Web have focussed on modifications made at the server end of the network, where, once again, limited information about the consumer is known in the absence of registration or other special arrangements. Again, any customization which takes place at the server can affect only material provided by that server. This remains essentially true even in the case where several servers share a common advertising server (as in the case of advertising networks like Double-Click Inc.), although in this case there can be some limited sharing of information about the consumer which is gleaned from the consumer's use of the several Web sites participating in the advertising network, in the case where any individual actually uses more than one of them.

Ideally, one would like to perform customization in such systems in a place which is logically (and perhaps physically) "close" to the consumer, such as at the Internet access provider or a firewall. Doing so would have several benefits over server-side customization, among them:

It would be possible to have such customization use more information about the consumer, abstracted from a variety of sources, including, possibly, the consumer's use of the Web.

Web sites which have no knowledge of the specific consumer might take advantage of downsteam customization capabilities, if they could retain a degree of control sufficient for their needs, over the advertisements which appeared in conjunction with their Web pages.

It would be possible to provide to the consumer guarantees regarding his privacy, as well as a mechanism which allows him to provide information which might aid the customization, and thereby benefiting him.

It would enable new forms of interaction and customization which are not feasible without a single location around which to focus such activity for a particular consumer.

Performing the customization in a decentralized way would make possible better caching of program material and generally improve the scaling characteristics of the system as the number of customers or users of the Web increased.

The barriers to such an arrangement have been several. Chief among them are

Copyright and licensing issues surrounding the question of modifying content owned by a Web site.

Allowing the Web site ("content") owner to retain control over the modifications which are presented in conjunction with his content. For example, he may wish to determine and control what categories of products are advertised.

Providing a means by which the various participants can settle financial aspects of the transactions with low cost, and without a need for many one-to-one contracts or relationships.

There is, therefore, a need for providing the capability of owner-controlled modification of program material close to the client which is to receive the modified material.

SUMMARY OF THE INVENTION

Accordingly, this invention is a method of controlling modification of program material as it is transmitted from a server to end users or clients through Internet access providers. With this invention the owner of program material ("Web site") can delegate the modification of this material to access providers and specify what modifications can be made.

In a broader aspect of this invention, an encrypted license tag is associated with program material, which may be in any form which permits the association of a such a tag. If the access provider can decrypt the license tag into clear text, then the access provider can be confident that he has permission to modify the program material. As a practical matter, the access provider can only obtain clear text of the license tag if he has a decryption key supplied by the owner or agent of the owner of program material.

With a more specific implementation of this invention, the information (or license tag) containing the location of modifiable program material and permissible modifications to program material is encrypted. The program material can, for example, be a Web page. Then, before the program material is sent to the client, the program material is examined to determine whether the encrypted information (license tag) is present and authentic. If it is, the clear text of the license tag describes the location(s) of the portion(s) of the program material that can be changed by the access provider. Then, the portion of the program material at the location described by the license tag is changed in accordance with profile information about the end user who is to receive the modified program material. Further, the encrypted license tag can also describe limitations which the owner of the information transmitted to the client or end user places on the modifications that may be made to the program material.

It is an object of this invention to enable modification of program material, such as an HTML (Hypertext Markup Language) file, at a location downstream from the web server. It is another more specific object of this invention to give the owner of a web page control over the modifications that can be made to its files.

It is also an object of this invention to provide a mechanism whereby a web site owner can be paid for granting the right to make modifications.

This application is being filed concurrently with another application entitled: METHOD FOR DISTRIBUTING ADVERTISING IN A DISTRIBUTED WEB MODIFICATION SYSTEM, IBM Docket Number YO997-124. The latter application is hereby incorporated herein by reference.

BRIEF DESCRIPTION OF THE DRAWINGS

FIG. 5 is an example of a specification from an advertiser to an access provider requesting delivery of an advertisement, which is a specific form of a program material modification.

FIG. 6 is a table illustrating how the invention can be applied to various kinds of communication networks.

DESCRIPTION OF THE PREFERRED EMBODIMENT

Figure 1:
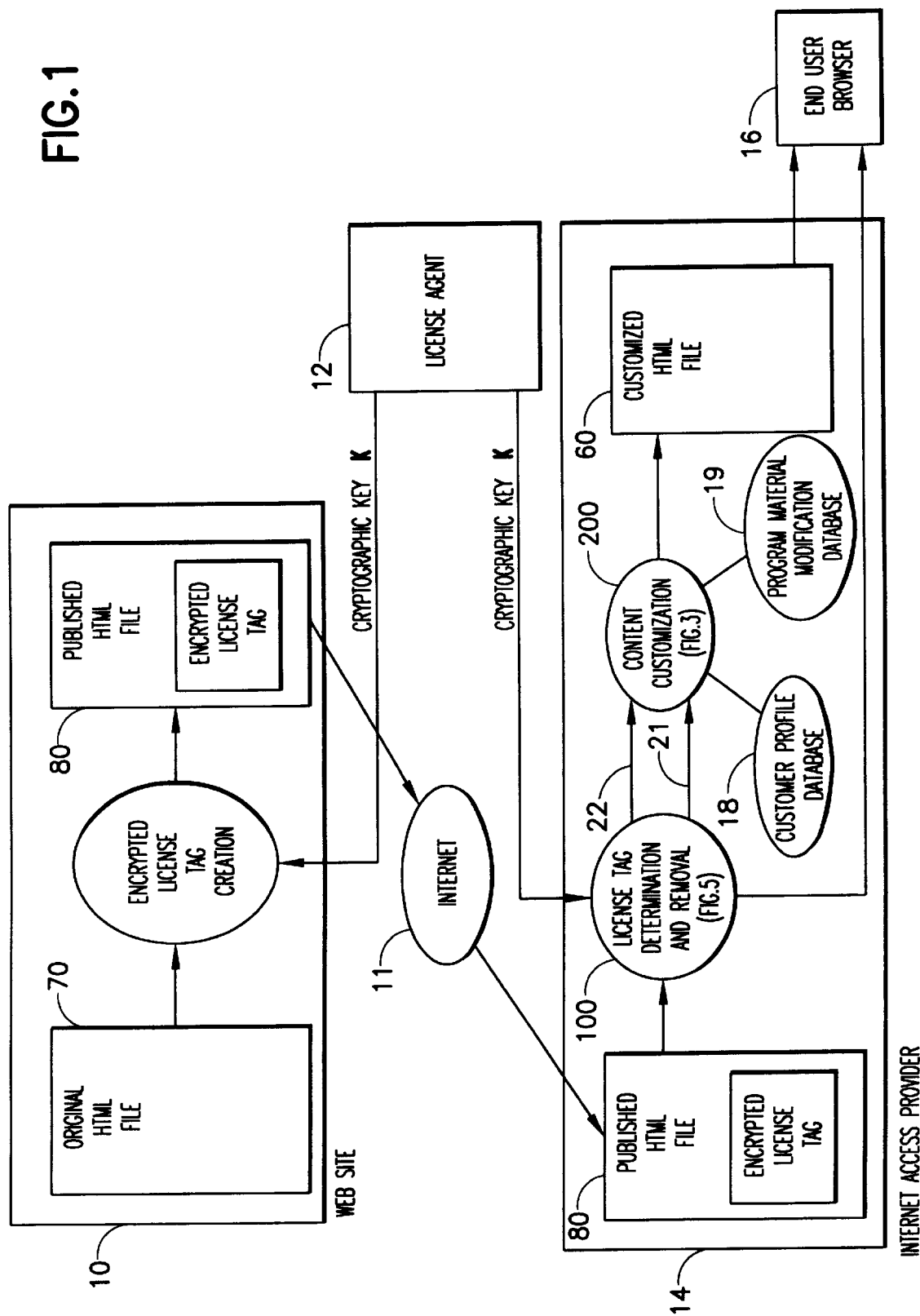
FIG. 1 schematically illustrates the overall operation of the invention when implemented in the World Wide Web.

FIG. 1 shows the overall structure of an embodiment in the World Wide Web in which the invention could be implemented. Shown is web server or web site 10 which is the source of HTML web pages, which are transmitted over a public communication network 11 or Internet to Internet access providers 14. Also shown are access providers which typically provide end user 16 access to the public communications network 11 or Internet. Absent this invention, the Internet access providers are basically passive: they transmit without change the information which is delivered by Web sites.

With this invention, the access provider determines whether it has a right to modify a particular HTML file received from a web server in a prescribed manner. This determination process is depicted as 100 in FIG. 1 and is described below with FIG. 5. A third party licensing agent 12, which has a contractual relationship with the web site and with the Internet access provider, distributes a cryptographic key K to the web server and to the Internet access provider as shown. The web server then uses this key to encrypt a license tag to be inserted into an HTML file, and the Internet access provider uses its copy of the key K to determine the authenticity of the license tag received from the web server as will be described below. If the license tag is authenticated, then the access provider which is making the determination has the right to modify, in ways described by the tag, the particular HTML file. Further, if the license tag is not present or is not authenticated, the unmodified published HTML file will be delivered to the client.

Shown also is the customer profile database 18 which stores information about each of the customers of the Internet access provider. The information in this database will be used to make specific modifications to HTML files in accordance with the customer's profile stored in the database. Client 16 then receives a customized HTML file which is modified in accordance with that client's profile, and in accordance with the constraints described in the license tag. Our illustrations and examples here show only replacement of a URL (Universal Resource Locator), but more complicated changes and modifications can be accommodated. In particular, text could be modified or added.

Figure 2:
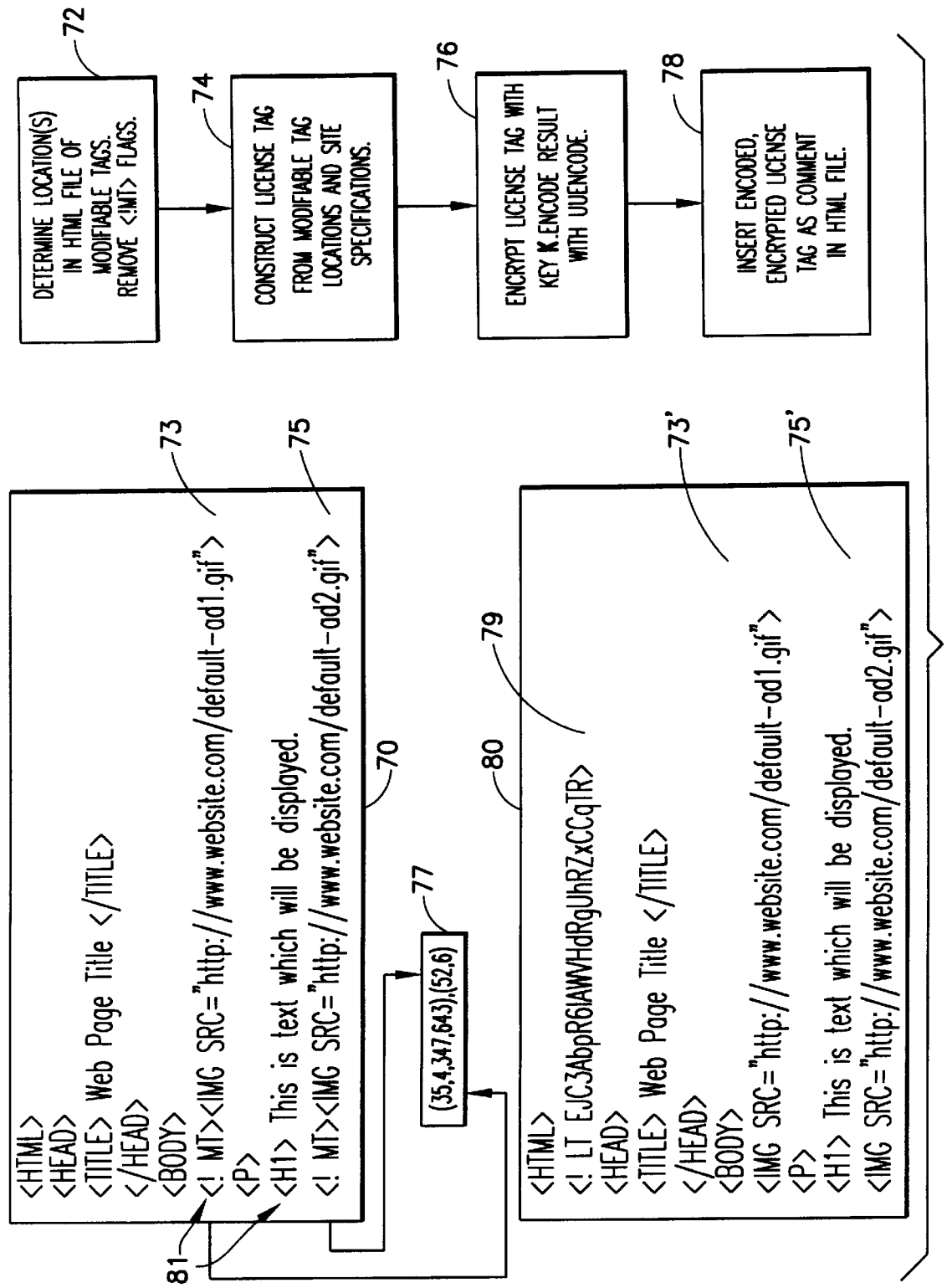
FIG. 2 shows an overview of how the license tag is created and inserted into an HTML file at a Web site to create the "published" version of the file.

FIG. 2 graphically illustrates the creation of a license tag at the web site 10. Variations of this process are possible, but this description emphasizes the novel aspects. The input to this process is a file 70 in the standard HTML language, created with standard tools. Comments 81 in this file are used to indicate to the license tag creation process those HTML constructs or text which the web site owner wishes to designate as modifiable by an Internet access provider. Here "MT" is used by convention to mean modifiable tag, to indicate to the process those constructs which are modifiable. Steps 72 through and including step 78 of FIG. 2 describe the process by which the standard HTML file 70 is modified to include the encoded encrypted license tag 79 shown in the published HTML file 80. As a part of this process, the "MT" tags in file 70 are located as shown in step 72, their positions are noted, and these tags are removed. As shown in 74 an unencrypted license tag is constructed using the locations of the modifiable tags noted in the previous step 72. Further, specifications from the web site are included in constructing the license tag. The specifications are, for example, illustrated by the numbers 347 and 643 in the unencrypted or clear text license tag 77. The numbers 35 and 52 in the clear text license tag illustrate the locations in the HTML file 70 which may be made by the Internet access provider. Not shown in the figure is information in the encrypted license tag which identifies the owner of the Web page, for purposes of reimbursement for the license grant. In step 76, the clear text license tag 77 is then encrypted with key K. The encrypted license tag is then encoded with, for example, UUENCODE. The result of step 76 is then inserted as shown at 79 in the modified HTML file 80. We have elected to include the license tag as an HTML comment; it could as well be included using a META tag. It is the latter file 80 that is delivered by the web site to the access providers.

Figure 3:
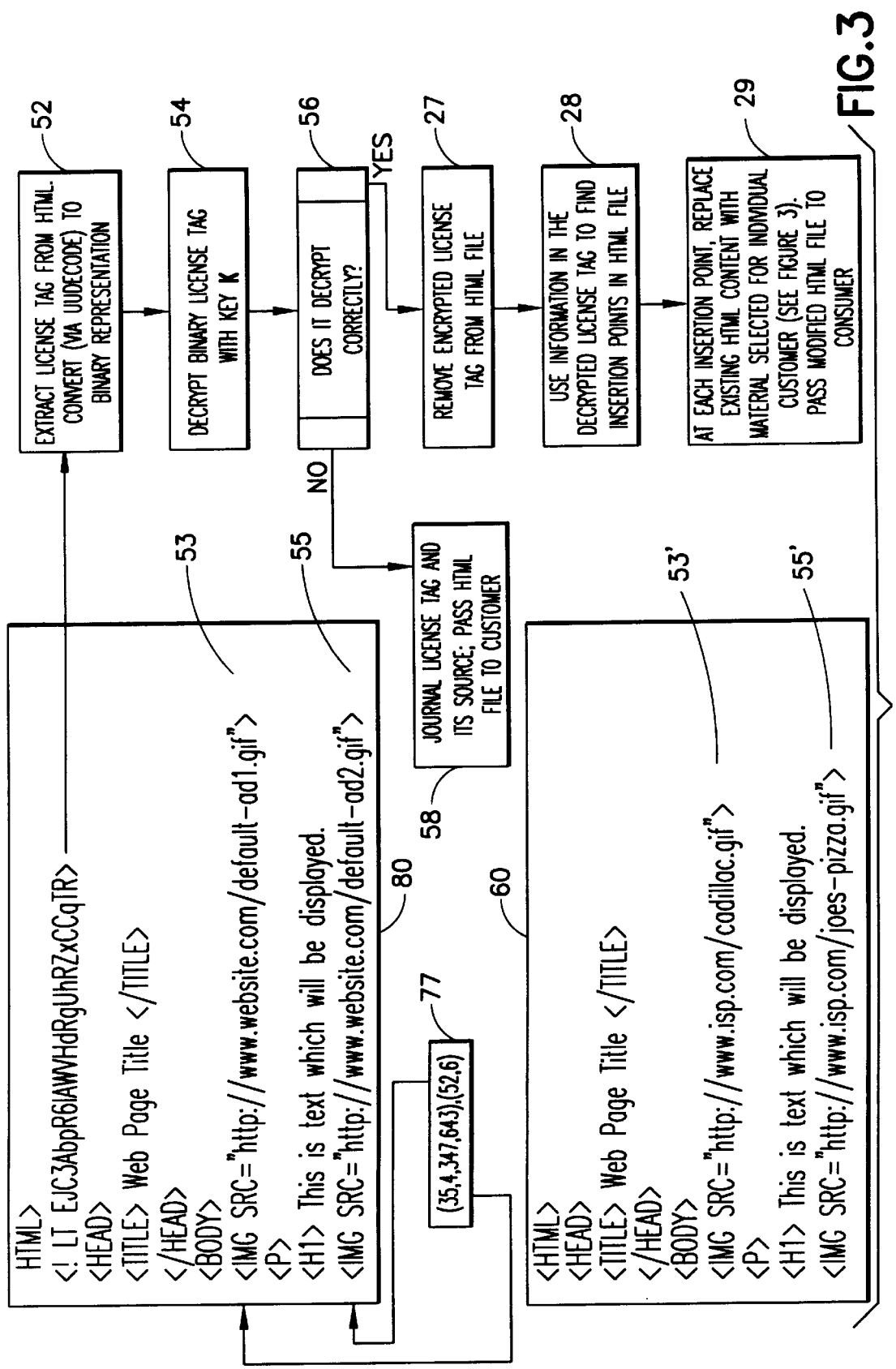
FIG. 3 shows an HTML file before and after it is customized at the access provider node. Also shown is the process by which the tag points to the location in the original file to be modified.

Referring now to FIG. 3, HTML file 80 is the actual file that is sent from the web server to the Internet access provider. The Internet access provider then reverses the process described above by decoding (with UUDECODE) the encoded encrypted license tag which had been inserted at the Web site and by decrypting the license tag to verify its authenticity. (See 54 and 56.) If the decryption process shows that the license tag is not authentic, the process terminates, and the unmodified HTML file is transmitted to the consumer 58. However, if the license tag is shown to be authentic 27, the clear text license tag will point to at least one location in the HTML which can be modified to customize it for the receiving consumer. See the information shown at 77, which is the clear text license tag. In this example, the numbers 35 and 52 are used to point to specific locations in the HTML file where modifications may be made. These locations may be indicated in terms of line number, byte offset, or by any other convenient or appropriate means. In the case of a different medium, such as sound, they might be indicated by time in seconds from the start of the program material. The numbers 6, 347 and 643 are used to describe the modifications that may be made at each location which the web page owner authorizes. For example, 347 might be an instruction not to include tobacco ads at the specified location, and 643 might indicate that automobile ads are particularly appropriate for this page. A variety of encodings and representations for this information are possible. This clear text tag is used by the Internet access provider in the process of FIG. 3 to make the actual modifications of the HTML file as shown for example in 60 of FIG. 5. Notice that, for example, lines 53 and 55 in the original HTML file 80 are changed as line 53' and 55' in the customized HTML file 60.

Figure 4:
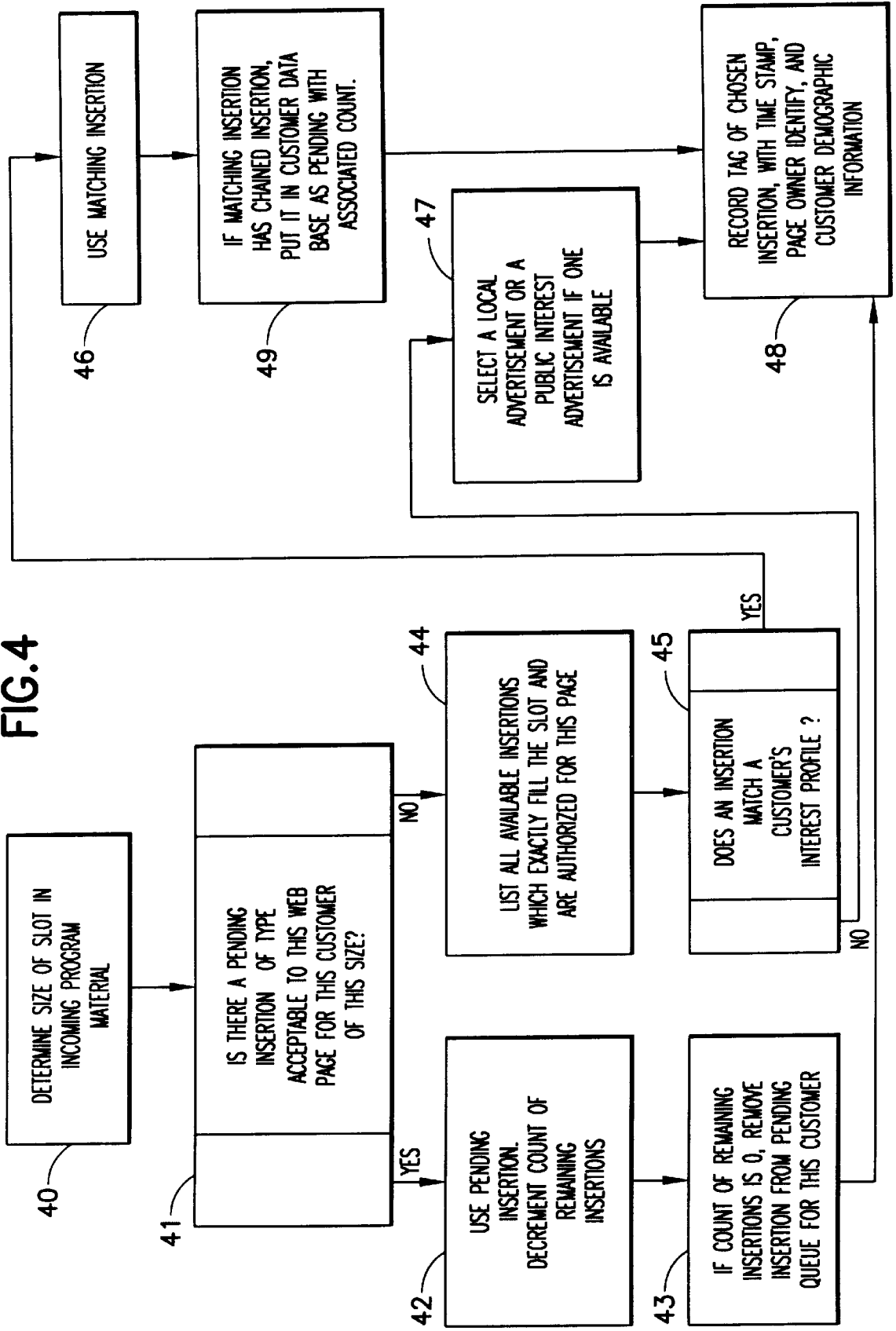
FIG. 4 is a flowchart illustrating the process by which a local access provider modifies the content of the program material to customize the material for individual clients.

Shown in FIG. 4 is the process by which an access provider customizes an HTML file for ultimate delivery to the client, and is only an example of a process to perform this function. Many variations of this process are possible. A process such as this would normally be implemented as an HTTP proxy, a well known technique. IBM's WBI, Web Browser Intelligence, is an example of a framework for implementing such a proxy.

The process described in FIG. 4 is performed for each modifiable slot or location in the HTML file. Starting at step 40, the size of the location or slot in the HTML file is determined. Next, in step 41, using information from the customer profile database, pending insertions associated with the client and acceptable to the web page owner are determined. Pending insertions are those which were determined to be appropriate for a particular customer by an earlier instance of this process (49), perhaps as part of a sequence of ads. If any such pending insertions are found, these insertions are used to modify the web page (42). Each time the insertion is used, a count is decremented (42). When the count finally reaches zero (43), the pending insertion is then deleted from the customer's profile database. Referring now to step 44 which occurs in the case where no acceptable pending insertions were found in the customer's profile database, a program material modification database (See 19 of FIG. 1) is accessed to find a list of all available insertions which fill the slot under consideration and which are consistent with the constraints set by the web page owner. The result of the insertions found in step 44 are then matched against the customer's interest profile in the customer's profile database (45). If an insertion is found to match the customer's interest profile, then the matching insertion (46) is inserted into the slot of what will become the customer's customized HTML page. If no match is found from step 45 in the customer's interest profile, a local advertisement or a public interest advertisement is selected for insertion into the slot of the customized HTML file. Of course, the latter must be of a type authorized by the Web page owner. The pending insertion of step 42, the targeted insertion of step 45, and the local or public interest insertion of step 47 are recorded in a separate journal which can be used for billing purposes.

Note that the previously described process operates on both pending insertions (which are those in the customer profile data base, and which have already been designated for a customer) and available insertions (which are those in the program material modification database, and which form the pool of all advertisements available for insertion). The capability provided by the notion of a pending insertion is that of delivering to a consumer a sequence of more than one advertisement, independent of the Web pages with which they are presented.

We note that an access provider could as a matter of policy elect not to customize some or all of the slots or locations which are present in an HTML file. By leaving at least one slot or location not customized, and by appropriately passing on a re-encrypted license tag, this would allow an access provider which is further downstream, perhaps at a firewall to customize the remaining slot or slots. In this role, an access provider is effectively acting as a Web server to a downstream provider.

The advertiser's request is shown in FIG. 5. For example, in the request, the advertiser specifies the start date of Dec. 1, 1996 and the ending date of Feb. 1, 1997 as shown. Also shown in the request is the number insertions, which is the total number of times that the ad is to be shown. The request may also include geographic information such as New York, New Jersey, and Connecticut. Also included may be the demographic target such as families with an estimated income of more than $50,000. The request shows an interest target such as subscribers having an interest in sports cars. Also shown, for example, in the request is the time of day during which the advertisement should be delivered to the client. With the click through URL address shown, the client can move to the advertiser's web page. The image URL is the web page address for the advertisement that is displayed. The above request can have many variations and is only shown as an example.

FIG. 5 illustrates the kinds of request stored in the access provider's program material modification database 19, which is used as input to the customization process shown at 44 of FIG. 4.

While the embodiment described above is limited to the Internet, this invention can be applied to many other types of networks. For example, referring to FIG. 6, this invention is also applied to digital and analog television and Internet radio/audio systems. The table shows the various representations that could be used for the license tag in the case of digital/analog television and Internet radio/audio systems. For example, with digital television the license tag could be placed in either the private stream or user data fields of an MPEG (Motion Picture Experts Group) data stream. In analog television the license tag could be inserted in the vertical blanking intervals. Finally in the Internet radio/audio systems the license tag could be inserted in spare bits in the data stream. The table also indicates the interpretation of the "size of the slot" for each type of communication system in which the invention is implemented. For example, in the case of the web site or web page, the size of the slot corresponded to actual space on a web page, while in the case of analog/digital television and Internet radio/audio, the "size of the slot" indicates the duration of a time slot in a forward communications channel. Also shown in the table is the type of data stream to be used for each system in which the invention is implemented. See for example NTSC for analog television. The last column of FIG. 6 shows the various types of program material which could be inserted into each of the respective systems.

Having thus described my invention, what I claim as new and desire to secure by Letters Patent is:

1. A method of modifying program material to customize said program material for use by an end user, said method comprising:

a. when generating modifiable program material for future customization:
  1) encrypting a license tag; and
  2) associating said encrypted license tag with said program material;

b. when examining putatively modifiable program material for possible customization:
  1) decrypting an associated encrypted license tag which is associated with said putatively modifiable program material; and
  2) modifying said putatively modifiable program material only if a clear text license tag is obtained from decrypting latter said associated encrypted license tag, wherein said putative program material is customized for use by said end user.

2. A method as recited in claim 1, wherein said license tag indicates which portions of said program material can be modified.

3. A method as recited in claim 1, wherein said licensed tag indicates the nature of modifications that can be made to said program material.

4. A method as recited in claim 1, wherein said license tag indicates which portions of said program material can be modified and what modifications can be made to said program material.

5. A method as recited in claim 1, wherein said license tag is associated with said program material by inserting said encrypted license tag in said program material.

6. A method as recited in claim 1, further comprising:

recording each modification made to said program material.

7. A method as recited in claim 1, wherein said putatively modifiable program is modified in accordance with profile information associated with said user terminal and in accordance with permissible modifications indicated by said clear text license tag.

8. A method as recited in claim 1, wherein said putatively modifiable program is modified in accordance with profile information associated with said user and in accordance with permissible modifications indicated by said clear text license tag.

9. A method as recited in claim 1, wherein said program material is a web page.

10. A method as recited in claim 1, wherein said program material is a digital television transmission.

11. A method as recited in claim 1, wherein said program material is an analog television transmission.

12. A method as recited in claim 1, wherein said program material is an audio transmission.

13. In a communications network having a source node of program material, an access provider node and at least one end user terminal connected to said network, a method of customizing said program material for use by said end user terminal, said method comprising:

a. when generating modifiable program material for future customization:
      1) encrypting a license tag by said source, said license tag indicating locations of said program material that can be modified by said access provider and what allowed modifications can be made by said access provider;
      2) inserting said encrypted license tag into said program material;
   b. when examining putatively modifiable material for customization:
      1) examining said program material to locate said encrypted license tag;
      2) decrypting said encrypted license tag to determine if a clear text license tag is obtained; and
      3) modifying said program material at said locations in accordance with said allowed modifications only if said clear text license tag is obtained, wherein said customized program material is obtained.

14. A method as recited in claim 13, wherein said communications network is an Internet network.

15. A method as recited in claim 1, wherein said communcations network is a cable TV network.

16. A method as recited in claim 13, wherein said communications network is a analog cable TV network.

17. A method as recited in claim 13, wherein said communications network is a digital communications network.

18. A method as recited in claim 13, wherein said communications network is a multimedia Internet network.

19. A method as recited in claim 13, wherein said access provider is a gateway.

20. A method as recited in claim 13, wherein said access provider is a firewall.

\* \* \* \* \*